United States Patent
Danel et al.

(10) Patent No.: US 10,422,713 B2
(45) Date of Patent: Sep. 24, 2019

(54) PRESSURE SENSOR SUITED TO MEASURING PRESSURE IN AN AGGRESSIVE ENVIRONMENT

(71) Applicant: COMMISSARIAT A L'ENERGIE ATOMIQUE ET AUX ENERGIES ALTERNATIVES, Paris (FR)

(72) Inventors: Jean-Sebastien Danel, Echirolles (FR); Bernard Diem, Echirolles (FR); Jean-Philippe Polizzi, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 93 days.

(21) Appl. No.: 15/537,179

(22) PCT Filed: Dec. 18, 2015

(86) PCT No.: PCT/EP2015/080519
§ 371 (c)(1),
(2) Date: Jun. 16, 2017

(87) PCT Pub. No.: WO2016/097306
PCT Pub. Date: Jun. 23, 2016

(65) Prior Publication Data
US 2018/0003584 A1    Jan. 4, 2018

(30) Foreign Application Priority Data
Dec. 19, 2014  (FR) ..................................... 14 62940

(51) Int. Cl.
*G01L 9/00* (2006.01)
*G01L 19/00* (2006.01)
*G01L 19/14* (2006.01)

(52) U.S. Cl.
CPC ............ *G01L 19/149* (2013.01); *G01L 9/008* (2013.01); *G01L 9/0052* (2013.01)

(58) Field of Classification Search
CPC ......... G01L 9/00; G01L 9/0045; G01L 9/005; G01L 9/0052; G01L 9/0054; G01L 9/008;
(Continued)

(56) References Cited

U.S. PATENT DOCUMENTS 3,715,638 A   2/1973  Polye
3,748,571 A   7/1973  Kurtz
(Continued)

FOREIGN PATENT DOCUMENTS

FR    2 875 300 A1    3/2006
JP    6-331471 A      12/1994
(Continued)

OTHER PUBLICATIONS

U.S. Appl. No. 13/546,411, filed Jul. 11, 2012, US 2013/0181302 A1, Sophie Giroud et al.
(Continued)

*Primary Examiner* — Nguyen Q. Ha
(74) *Attorney, Agent, or Firm* — Oblon, McClelland, Maier & Neustadt, L.L.P.

(57) ABSTRACT

A pressure sensor to measure low pressures, including: a body extending in a plane, the body including a measurement zone situated at an end of the body, a connection zone situated at another end of the body, the measurement zone including a cavity delimited by a wall, that is deformable under effect of a difference in pressure between inside of the cavity and an external environment, the deformable wall situated at rest in a plane parallel to the plane of the sensor; a mechanism measuring deformation of the deformable wall, the measurement mechanism situated in the cavity; an electrical connection connecting the measurement mecha-
(Continued)

nism to the connection zone, the electrical connection arranged in the body.

14 Claims, 6 Drawing Sheets

(58) Field of Classification Search
CPC ..... G01L 19/00; G01L 19/0627; G01L 19/14; G01L 19/147; G01L 19/149
See application file for complete search history.

(56) References Cited

U.S. PATENT DOCUMENTS

| | | | |
|---|---|---|---|
| 4,274,423 A | 6/1981 | Mizuno et al. | |
| 5,715,827 A | 2/1998 | Corl et al. | |
| 5,861,558 A | 1/1999 | Buhl et al. | |
| 5,955,771 A | 9/1999 | Kurtz et al. | |
| 6,106,476 A | 8/2000 | Corl et al. | |
| 6,767,327 B1 | 7/2004 | Corl et al. | |
| 7,633,131 B1* | 12/2009 | Padmanabhan | B81C 1/00158 257/288 |
| 7,918,136 B2* | 4/2011 | Muchow | G01L 9/0055 73/721 |
| 2002/0005072 A1 | 1/2002 | Nidan et al. | |
| 2003/0018273 A1 | 1/2003 | Corl et al. | |
| 2003/0040674 A1 | 2/2003 | Corl et al. | |
| 2006/0094982 A1 | 5/2006 | Corl et al. | |
| 2007/0135718 A1 | 6/2007 | Corl et al. | |
| 2007/0149885 A1 | 6/2007 | Corl et al. | |
| 2010/0073123 A1* | 3/2010 | Craddock | G01L 9/0054 338/42 |
| 2011/0251497 A1 | 10/2011 | Corl et al. | |
| 2011/0309458 A1* | 12/2011 | Gamage | G01L 9/0042 257/419 |
| 2013/0139589 A1 | 6/2013 | Hoenicka et al. | |
| 2014/0341255 A1 | 11/2014 | Kaiser et al. | |
| 2016/0231189 A1* | 8/2016 | Kuehne | G01L 9/005 |

FOREIGN PATENT DOCUMENTS

| | | |
|---|---|---|
| WO | 96/07351 A1 | 3/1996 |
| WO | 2014/136336 A1 | 9/2014 |

OTHER PUBLICATIONS

U.S. Appl. No. 14/395,227, filed Oct. 17, 2014, US 2015/0129538 A1, Hubert Grange et al.
U.S. Appl. No. 15/501,686, filed Feb. 3, 2017, Francois De Crecy et al.
International Search Report dated May 2, 2016 in PCT/EP2015/080519 filed Dec. 18, 2015.
French Search Report dated Aug. 12, 2015 in FR 1462940 filed Dec. 19, 2014.
International Preliminary Report on Patentability dated Mar. 2, 2017 in PCT/EP2015/080519 filed Dec. 18, 2015.

* cited by examiner

PRESSURE SENSOR SUITED TO MEASURING PRESSURE IN AN AGGRESSIVE ENVIRONMENT

TECHNICAL FIELD AND STATE OF PRIOR ART

The present invention relates to a pressure sensor able to advantageously measure at least low pressures, for example from about 0.1 bar and able to be used in harsh media.

Currently, there are many types of pressure sensors, comprising microelectronic sensors based on silicon micromachining. These microelectronic sensors are generally made from a silicon substrate, on a so-called "chip" zone. A part of this silicon chip, being often central, is thinned so as to make a membrane. The non-thinned zone of the chip forms a frame which ensures holding of the membrane. The frame and the membrane are assembled either directly to the piece subjected to pressure, or on a planar support, attached to this piece. A cavity is then formed between this support (or the piece acting as a support) and the membrane. Thus, under the effect of a pressure difference between the inside of the cavity and the outside of the sensor, the membrane is deformed. The deformation of the membrane is converted thanks to an electromechanical transducer into an electrical quantity, measured by processing means located outside the sensor or integrated on the same.

The pressure measurement can be made through one or more strain gauges, for example gauges of piezoresistive material placed on the membrane.

The strain gauge(s) is/are connected to connectors which convey the signal to a processing unit.

The sensor is generally made by microelectronic techniques by deposition and etching layers onto a support. The membrane then forms the front face of the sensor.

The sensor is disposed such that the membrane is in a contact with the medium the pressure of which is desired to be measured.

The connections of the strain gauges to the connectors can then be made in the front face. However, in the case where the sensor is used to measure the pressure in a harsh medium, i.e. in contact with a fluid other than the air, the connections would be in contact with the medium and could undergo a physico-chemical attack, consequently the sensor could be damaged. For this, it is provided to encapsulate the membrane provided with the gauges and the connections of the gauges into an oil-filled cavity which does not damage the gauges and connections, the oil transmitting pressure to the membrane. However, the implementation of oil to transmit pressure raises problems in terms of metrology, because the oil disturbs in particular the temperature behaviour and such an embodiment has a high cost.

To overcome this problem, the connections can be made in the rear face. For this, they are made through the support. This technique demands the development and control of very advanced technologies to be reliable. Thus, the manufacturing cost of this sensor is high. Such a sensor is for example described in document U.S. Pat. No. 5,955,771.

DISCLOSURE OF THE INVENTION

The purpose of the present invention is then to make a pressure sensor able to measure pressures on a very wide range of values, wherein the pressures can range from low pressure to high pressure, and in particular in harsh media.

In the present application, by "low pressures" it is meant pressures in the order of less than 0.1 bar up to several bars, with an accuracy and/or resolution in the order of one millibar.

The abovementioned purpose is achieved by a pressure sensor comprising a body extending in a plane, called a "sensor plane", comprising an end carrying a sensitive zone for detecting the pressure variation and an end carrying a connection zone for connecting the sensor to an external system, the sensitive zone comprising a cavity delimited by walls at least one of which is movable or deformable under the effect of the pressure difference between the environment the pressure of which is desired to be measured and the cavity, said movable or deformable wall being located in a plane parallel to the sensor plane. Means for measuring the deformation of said deformable wall are disposed inside the cavity, connectors connect the measurement means to outside, the connectors extending from the measurement means to the connection zone through inside the body.

By implementing a movable or deformable wall, the sensor according to the invention is capable of detecting low pressure variations for example in the order of a few millibars up to several tens of bars, or even more. The pressure range is in particular given by the dimensions of the deformable membrane.

On the other hand, providing measurement means inside the cavity and connection means in the body enable them to be protected from the external environment. The duration and robustness of the sensor are thus increased.

Further, the fact that the membrane is in a plane parallel to the sensor plane substantially simplifies the manufacture of the connection means, in particular the connection between the measurement means and the connection means is simplified, because one or more materials can be used to made the connection means which do not have a particular resistance to physico-chemical attacks. As a result, the manufacturing cost is reduced.

In addition, a relative pressure sensor can be simply made by etching a trench between the cavity and the connection zone.

Consequently, one subject-matter of the present invention is a pressure sensor able to measure at least low pressures comprising a body extending in a plane, called a sensor plane, said body comprising a first end and a second end, a measurement zone, located at the first end of the body, a connection zone located at the second end of the body, said measurement zone comprising at least one cavity delimited by at least one movable or deformable wall under the effect of a pressure difference between the inside of the cavity and an external medium, said movable or deformable wall being located at least at rest in a plane parallel to the sensor plane, said sensor also comprising means for measuring the displacement or deformation of the movable or deformable wall, said measurement means being located in the cavity, electrical connection means connecting the measurement means to the connection zone, said electrical connection means being disposed in the body, the body being intended to be disposed at least partly in the medium the pressure of which is desired to be measured such that said first end is in said medium, and the connection zone being intended to be insulated from the medium to allow an electrical connection with an external environment separated from the medium.

In one exemplary embodiment, the body is held between the medium the pressure of which is desired to be measured and the external environment by a wall disposed between said medium and the external environment, the body being sealingly mounted in a passage formed in said wall.

In another exemplary embodiment, the body is mounted on a wall disposed between said medium and the external environment, the body being sealingly mounted on a passage formed in the wall.

For example, the measurement means comprise at least one gauge of piezoresistive or piezoelectric material disposed on a face of the movable or deformable wall located in the cavity. Preferably, the gauges of piezoresistive or piezoelectric material are mounted as a Wheatstone bridge.

Alternatively, the measurement means are capacitive measurement means.

In one exemplary embodiment, a reference pressure prevails in the cavity. In another exemplary embodiment, the sensor comprises, in the body, a fluid connection or channel between the cavity and the connection zone so as to connect the cavity to the external environment, the sensor being a relative pressure sensor for the relative pressure between the external environment and the medium to be measured. Preferably, the fluid channel extends in parallel to the movable or deformable wall.

The sensor can comprise in the measurement zone, at least two deformable walls located at least at rest in one or more plane(s) parallel to the sensor plane.

In one advantageous example, the body comprises a first substrate and a second substrate secured to each other, the connection means being wholly or partly disposed between and/or in the first substrate and the second substrate.

The movable or deformable wall can comprise a membrane. Alternatively, the movable wall comprises a substantially undeformable central zone, a deformable peripheral zone and means for rigidifying the peripheral zone, those possibly comprising at least one beam.

Another subject-matter of the present invention is also a facility comprising a medium the pressure of which is desired to be measured, a wall separating said medium from an external environment, at least one passage passing through the wall and at least one pressure sensor according to the invention, sealingly mounted in the passage such that the measurement zone is in said medium and the connection zone is in the external environment.

Another subject-matter of the invention is also a facility comprising a medium the pressure of which is desired to be measured, a wall separating said medium from an external environment, at least one passage passing through the wall and at least one pressure sensor according to the invention mounted on the wall in proximity to the passage, such that the measurement zone is in said medium and the connection zone is in the external environment and sealingly insulated from the medium.

Another subject-matter of the invention is also a manufacture method for manufacturing a pressure sensor according to the invention, comprising the steps of a) from a first substrate, making measurement means and connection means in the front face of said first substrate, b) from a second substrate, structuring a front face of the second substrate to delimit a part of the cavity and a part of the connection zone, c) securing the first and the second substrate by their front faces such that the measurement means face the part of the cavity delimited in the second substrate, d) structuring the first or second substrate to access the connection means and form the connection zone.

After step c), the first substrate can be structured to form the deformable wall, for example by thinning at the measurement means.

During step a), forming an electrically insulating layer on the connecting means can be provided.

The manufacture method can comprise, during step b), making in the first and/or the second substrate, a channel between the part of the cavity and the part of the connection zone, for example by etching, said channel being configured for forming the fluid connection between the cavity and the connection zone of the sensor.

BRIEF DESCRIPTION OF THE DRAWINGS

The present invention will be better understood based on the description that follows and the appended drawings in which.

DETAILED DISCLOSURE OF PARTICULAR EMBODIMENTS

In FIGS. 1 to 4, an exemplary embodiment of a sensor according to the present invention can be seen. This is a sensor for measuring a pressure with respect to a reference pressure, for example an absolute pressure sensor. In the following of the description, an exemplary relative pressure sensor will be described.

The sensor that will be described in detail comprises at least one wall which is deformable under the effect of a pressure difference. But a sensor comprising a wall being movable under the effect of a pressure difference without substantial deformation of the wall does not depart from the scope of the present invention, this embodiment is described below.

The sensor comprises an elongate-shaped body 2 extending in a plane P, called a sensor plane. In the example represented, the body 2 extends along a longitudinal axis X.

The body 2 comprises a first longitudinal end 4 carrying a sensitive zone 6 intended to be in contact with the medium the pressure of which is desired to be measured, called the medium to be measured E. The body comprises a second longitudinal end 8 opposite to the first longitudinal end 4 carrying a connection zone 10 for allowing the electrical connection of the sensor to an external system in an insulated manner with respect to the medium the pressure of which is desired to be measured. The external system is for example an electronic processing circuit.

The medium to be measured E can be a harsh or aggressive medium such as acid gazes, polar liquids, fuels, etc., this medium can be subject to physico-chemical attacks. It is to be noted that water can also be considered as an aggressive medium.

The sensitive zone 6 comprises a sealed cavity 12 located in the body 2. The pressure inside the cavity 12 is a reference pressure, for example vacuum. The cavity is delimited by walls at least one of which is able to be deformed under the pressure difference between that of the external medium and the reference pressure in the cavity 12. In the example represented, the cavity is delimited by a membrane 14 forming the upper wall, able to be deformed under the pressure difference, side walls 16 and a lower wall 18 not being deformed under the pressure difference. The membrane extends in a plane parallel to the sensor plane P.

The sensor comprises means for measuring the deformation of the membrane 14 under the effect of the pressure difference. These means are disposed inside the cavity, thus they are protected from the medium to be measured. These measurement means comprise the electromechanical conversion means which convert the deformation of the membrane due to the pressure difference into an electrical signal which will be processed by an external system (not represented).

In the example represented, the electromechanical conversion means are formed by at least one strain gauge of a piezoresistive material, for example of silicon, or of piezoelectric material for example of AlN.

Preferably, the measurement means comprises several strain gauges 20 which can be mounted as a Wheatstone bridge. In the example represented, four strain gauges are implemented. The gauges are disposed on an internal face 14.1 of the membrane, such that the deformation of the membrane, under the effect of the external pressure, induces in the gauges an electrical unbalance. The membrane is deformed either inwardly of the cavity 12, or outwardly of the cavity 12 and the gauges are deformed along the curvature of the membrane 14. Their deformation is proportional to the pressure difference between the cavity 12 and the medium to be measured E.

The device also comprises means for connecting the measurement means 20 to the external system which is configured to process the signals emitted by measurement means 20 and means for connecting the gauges to each other in the case where they are several gauges. The connection means are formed by one or more electrical conductors 24 connecting the gauges to the connection zone 10. The electrical conductors are located inside the body of the device and substantially extend along the longitudinal axis X. The electrical conductors 24 open into the connection zone 10 in which they are in contact with one or more contact pads 26 by which the device is intended to be connected to the external system.

The electrical conductors also advantageously extend in a plane parallel to the sensor plane. Thus, making the connection to the measurement means is simplified. It does not require to pass through the rear face of the substrate.

The electrical conductor(s) 24 is (are) "encapsulated" in the body and extend in the cavity 12 insulated from the medium to be measured and the connection zone 10 which is also insulated from the medium to be measured. Thus, they are protected from the medium to be measured.

Particularly advantageously, the device is made by microelectronic techniques. A manufacturing method will be described in detail.

The body is then advantageously formed by assembling two substrates 2.1, 2.2 and the electrical conductor(s) is (are) for example made by forming a layer of conductor material for example of metal, such as aluminium, gold, copper, tungsten, titanium . . . or a doped semi-conductor such as silicon, polysilicon, germanium which is for resisting to high temperature. An etching step can then be possibly provided.

The electrical conductors are in the form of conductive tracks and for example made by depositing one or more layers by usual microelectronic techniques, such as physical vapour deposition (PVD) or chemical vapour deposition (CVD) which are then etched, for example by wet chemical or plasma etching through a lithography mask. Preferably, the contact pads 26 are made in this (these) conductive layer(s), or by a further deposition specific and compatible to allow outwardly contacting by wire bonding type techniques. An electrically insulating layer 27 is provided on the tracks.

Figure 2:
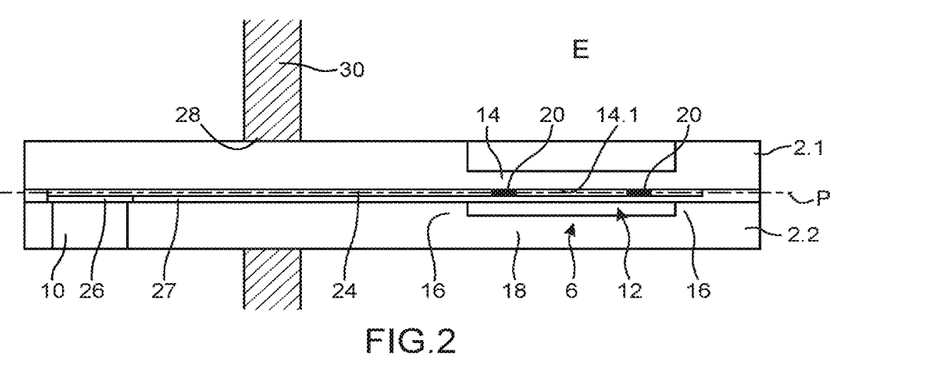
FIG. 2 is a longitudinal cross-section view of the sensor of FIG. 1 along plane B-B.
Figure 3:
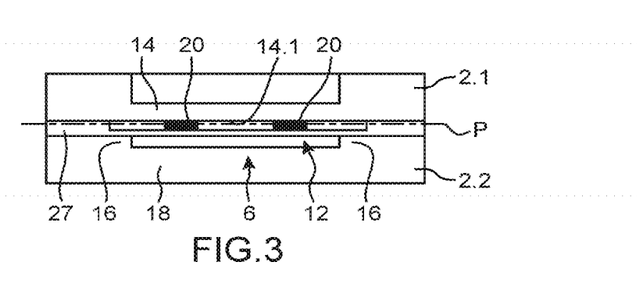
FIG. 3 is a transverse cross-section view of the sensor of FIG. 1 along plane A-A.
Figure 4:
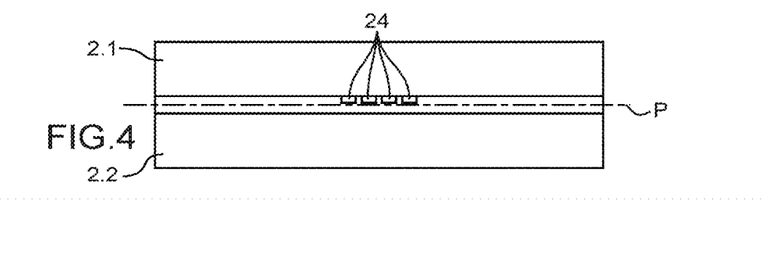
FIG. 4 is a transverse cross-section view of the sensor of FIG. 1 along plane C-C.

For example, the sensor is intended to be mounted in a passage 28 formed in a wall 30 separating the medium to be measured to the external environment. The body 2 of the sensor is sealingly mounted in the passage 28 through the wall such that the measurement zone 6 is in the medium to be measured E and the connection zone 10 is in the external environment.

Figure 10:
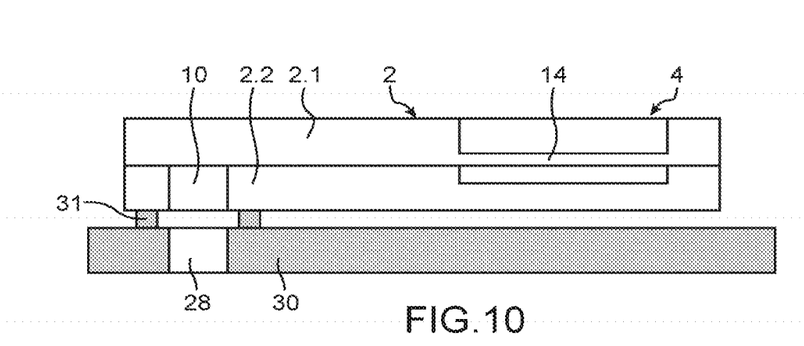
FIG. 10 is a representation of an alternative mounting of a sensor according to the invention on a wall.

In FIG. 10, an alternative mounting of the sensor can be seen, in which this is mounted on the wall and is fully disposed in the medium and in proximity to the passage 28. The connection zone 10 is located in proximity to the passage 28 and a seal 31 is made between the connection zone 10 and the passage 28 enabling insulation of the connection means from the medium and a connection to an external system located in the external environment.

In the example represented, the membrane 14 is formed by locally thinning the substrate 2.1 just above the cavity 12. Thus, the substrate 2.1 has a higher thickness around the membrane forming a frame. The frame thickness is advantageously chosen sufficiently high to provide the entire sensor with a sufficient rigidity enabling it to undergo, if need be, high pressures, which can be, for example higher than 10 MPa or 100 MPa. But it will be understood that the entire substrate 2.1 could be thinned to have a constant thickness equal to that of the membrane, for example by a full plate thinning, since the substrate 2.2 also provides rigidity to the sensor, and to compensate for the low thickness of the substrate 2.1. Accessing to the contact pads 26 is achieved by etching the second substrate.

Figure 1:
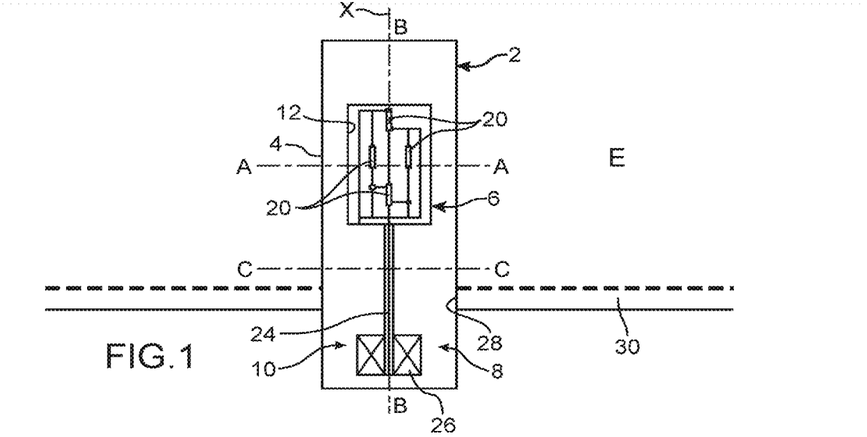
FIG. 1 is a top view of an exemplary embodiment of a sensor according to the invention.

In the example represented, the sensor has a rectangular shape and the membrane has a rectangular shape in FIG. 1. Alternatively, the membrane could be square. Further alternatively, it could be provided that the membrane has a circular shape.

By way of example, the thickness of the entire sensor, that is of both assembled substrates 2.1, 2.2, is in the order of a few 100 µm to a few mm and its length of a few 100 µm to a few tens of millimeters.

By way of example also, the thickness of the deformable membrane is in the order of a few micrometers, preferably lower than 100 µm. The thickness of the membrane can however reach several hundreds of µm for measuring high pressures.

The depth of the cavity 12 is for example in the order of a few micrometers up to several hundreds of micrometers. This depth is chosen as a function of the deformation of the membrane and its maximum deflection in order to avoid a contact between the membrane and the bottom of the cavity, which would alter the measurements in the measurement range. However, it could be provided to adjust the depth such that the membrane contacts with the bottom of the cavity for high pressures, which would be outside the measurement range of the sensor. The bottom of the cavity then would form a stop for the membrane, avoiding deterioration of the membrane and thus protecting the sensor.

Figure 7:
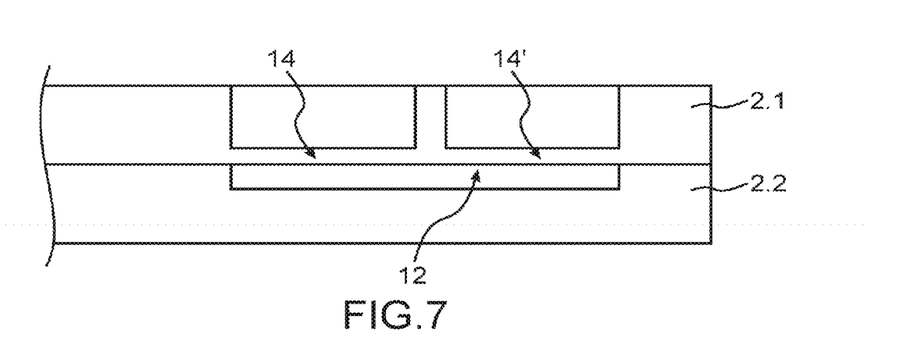
FIG. 7 is a partial schematic longitudinal cross-section view of an alternative embodiment of a sensor according to the invention comprising two juxtaposed membranes.

Alternatively, it could be provided that the measurement zone comprises two deformable walls 14, 14' (FIG. 7). Both deformable walls 14, 14' are parallel to the sensor plane and are juxtaposed. According to another alternative represented in FIG. 8, the bottom 12.1 of the cavity 12 has a thickness enabling it to be deformed under the pressure difference, thus forming a deformable wall 14". Means for measuring the deformation of this second deformable wall 14" are then provided. These means, for example of the strain gauge type, are connected to the external system by electrically conducting means travelling in the body up to the connection zone. Preferably the second deformable wall 14" has the same thickness as the deformable wall 14.

According to another embodiment of the invention, the measurement means are of the capacitive type. The measurement means comprise one or more electrodes carried by the bottom of the cavity inside the cavity and one or more electrodes facing it (them), which is (are) carried by the membrane so as to form capacitors the capacitance of which varies as a function of the deformation of the membrane. In the case of a cavity comprising two deformable membranes such as represented in FIG. 7, at least one electrode is positioned on the face of each deformable membrane located inside the cavity, at least one fixed electrode being possibly formed by the substrate 2.2 or deposited onto the substrate. Two capacitance variations are then measured. If both assemblies formed by each of the membranes and the electrode(s) they carry have close or identical mechanical properties, the measured capacitance variations will be close or identical. It could be contemplated to connect these two capacitances or more in parallel to increase the signal. This embodiment has the advantage to have a high area and thus to allow for obtaining a high capacitance, and a limited deformation of the membranes.

Figure 8:
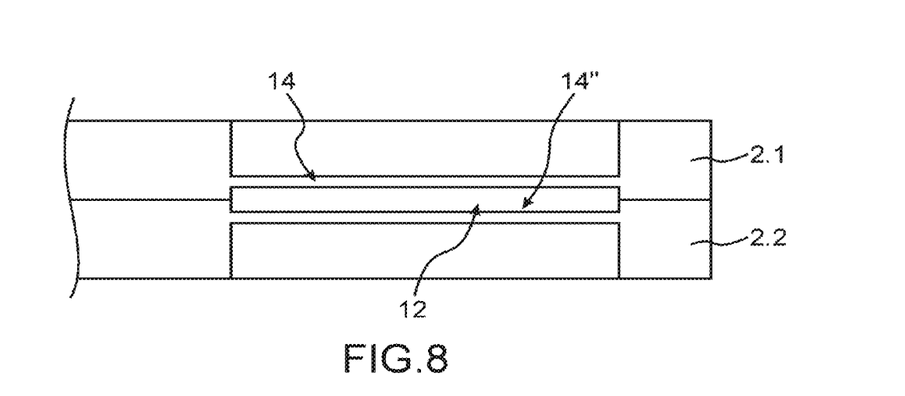
FIG. 8 is a partial schematic longitudinal cross-section view of an alternative embodiment of a sensor according to the invention wherein the cavity is delimited by two membranes.

In the case of the sensor of FIG. 8, at least one electrode is positioned on the face of each deformable membrane located inside the cavity. Thereby, the electrodes are facing each other. Consequently, a capacitance variation is measured between the deformable membranes.

Both for the sensor of FIG. 7 and for that of FIG. 8, the connectors up to the pads 26 are made by means of conductors 24. Advantageously, these electrodes are made in the meantime and with the same material as the conductors 24.

Figure 9A:
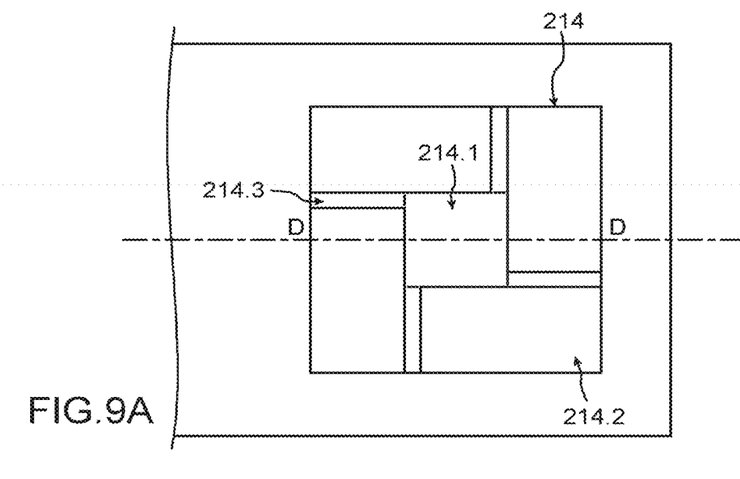
FIG. 9A is a partial top view of an alternative embodiment of a sensor according to the invention in which the cavity comprises a movable wall.
Figure 9B:
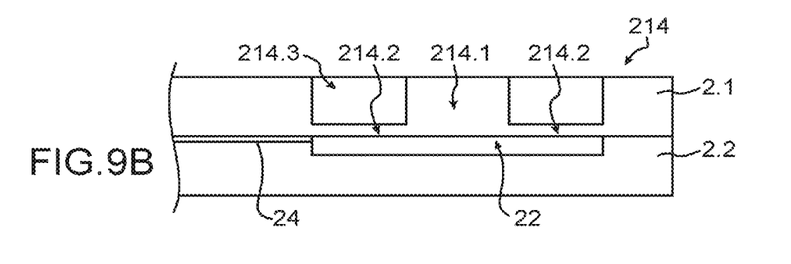
FIG. 9B is a cross-section view of FIG. 9A along plane D-D.

In another embodiment represented in FIGS. 9A and 9B, the movable wall 214 can comprise a substantially undeformable central part 214.1, a peripheral zone 214.2 able to be deformed and beams 214.3 extending from the central part 214.1 to the edge of the movable wall on the peripheral zone 214.2. The central part 214.1 can have a thickness substantially greater than that of the peripheral zone. The peripheral zone then is mainly used to close the reference cavity 12 to ensure hermeticity. Under the effect of a pressure difference, the central part moves in parallel to itself. This displacement can be measured by a capacitance variation, for example between the central part and the bottom of the cavity, or by means of strain gauges disposed on beams 214.3.

The sensitivity of the sensor can then be set by adjusting the rigidity provided by the beams, for example by choosing a suitable geometry for the beams. Thereby, it is possible to simply make sensors covering different pressure ranges on a same substrate by varying the dimensions of the beams, i.e. their length and/or their width. Indeed in the case of a sensor comprising a simple membrane, the variation in the rigidity is achieved by varying the depth of the local thinning of the substrate which is achieved by etching, or this is relatively complex to make because generally, the etching depth is identical on the entire substrate.

Figure 6:
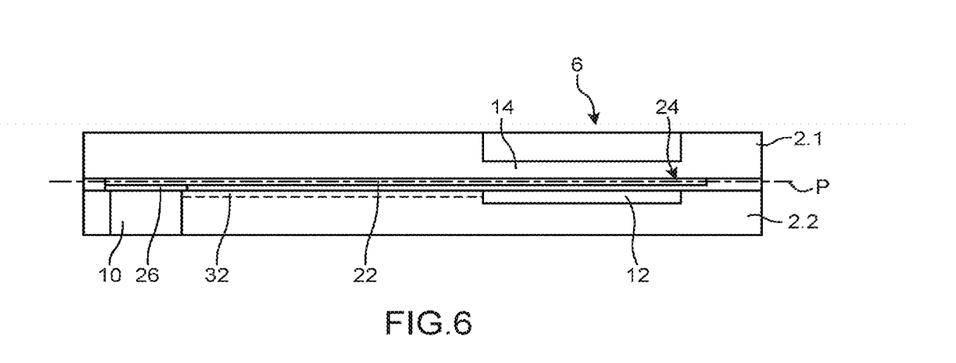
FIG. 6 is a longitudinal cross-section view of an exemplary embodiment of a relative pressure sensor.

In FIG. 6, an exemplary embodiment of a relative pressure sensor can be seen. This sensor is distinguished from the absolute pressure sensor of FIG. 1 in that the cavity 12 is no longer at the reference pressure but is fluidly connected to the external environment.

In the example represented and particularly advantageously, the fluid connection is made by means of a channel 32 formed between the substrates or in either substrate between the cavity 12 and the connection zone 10. Since the channel 32 opens into the connection zone 10 which is insulated from the medium to be measured, there is no risk that elements of the medium to be measured can access the cavity 12 via the channel 32. A longitudinal cross-section of the channel 32 is for example visible in FIG. 6. Preferably, the channel 32 extends in parallel to the movable or deformable wall.

The pressure sensor according to the invention has the following advantages:
- it enables a wide pressure range to be measured by virtue of the implementation of at least one membrane, the extreme values of the range are set by choosing the dimensions of the membrane.
- It is robust and has an increased lifetime, by disposing the measurement means inside the cavity, which protects them from the external medium which can be possibly aggressive and by disposing the zone for connecting to the environment in a zone distant from the measurement zone.
- It is of a simplified manufacture, reliable and with a reduced production cost since contacting the measurement means is not made in the rear face of the membrane.
- The implementation of an oil-filled cavity is avoided, thus avoiding the metrology problem and reducing manufacturing costs.
- It has a reduced bulk, the sensor has a planar configuration with a thickness which can be reduced, the membrane and the connection means being in the same plane or parallel planes. Unlike sensors of the state of the art, the membrane is perpendicular to the connection means, thereby they have a high thickness.

An exemplary method for making a pressure sensor of FIGS. 1 to 4 will now be described in connection with FIGS. 5A to 5I.

Figure 5A:
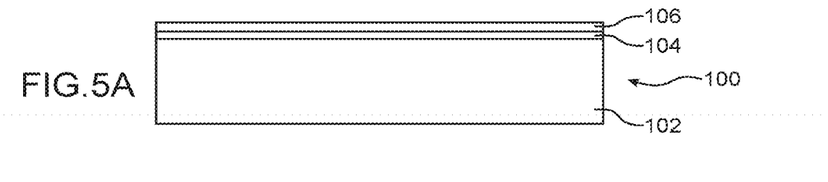
FIGS. 5A to 5I are schematic representations of steps of an exemplary method for making a sensor of FIG. 1.

First, a substrate is provided, which can for example be a substrate of silicon or SOI (Silicon on insulator) substrate. In FIG. 5A, this is a SOI substrate 100, comprising a support substrate of semi-conductor material, for example of silicon 102, a layer of dielectric material 104 for example of oxide, for example a BOX (Buried Oxide) and a layer of silicon 106. For example, the BOX layer has a 2 μm thickness and the Si layer 106 has a 0.2 μm thickness.

During a next step, the strain gauges and the electrical conductors are defined in the silicon layer 106, for example by means of a localised silicon oxidation (LOCOS). The LOCOS method consists in conducting oxidation of the silicon layer, in the present case of the entire thickness of the layer 106 through a mask usually of $Si_3N_4$ (silicon nitride). The oxidation is performed by thermal oxidation, for example by means of water vapour at a temperature in the order of 1 100° C. The protection mask is then removed by chemical or plasma etching. During the oxidation step, the rear face of the silicon substrate is also oxidised if there is no protection. Oxidised zones 108 are obtained in the layer 106.

Figure 5B:
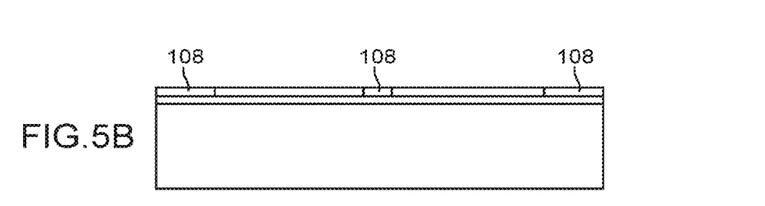

The element thus obtained is represented in FIG. 5B.

During a next step, the gauges and electrical conductors are formed by doping, for example by implanting the silicon of the layer 104 into the non-oxidised zones. The zones of the doped gauges are designated as 110. The doping of the gauges and conductors can be different and adapted to their function. For example, zones can be strongly doped to make the conductors, thus they will have a small resistance, and zones can be moderately doped to make the gauges, thus they will have a high sensitivity.

Figure 5C:
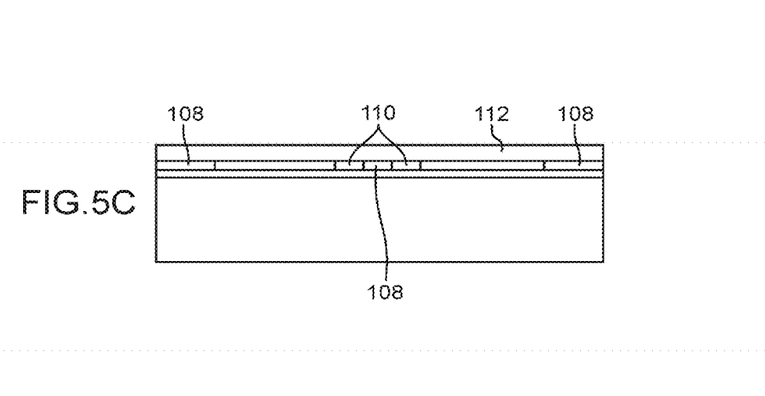

The element thus obtained is represented in FIG. 5C.

During a next step, an encapsulation of the gauges and electrical conductors is made for example by forming a layer 112 on the front face of the stack of FIG. 5C. This layer is for example a high temperature oxide (HTO) deposited by a CVD technique. This electrically insulating layer will enable the electrical conductors to be insulated from the second substrate when both substrates are assembled.

Figure 5D:
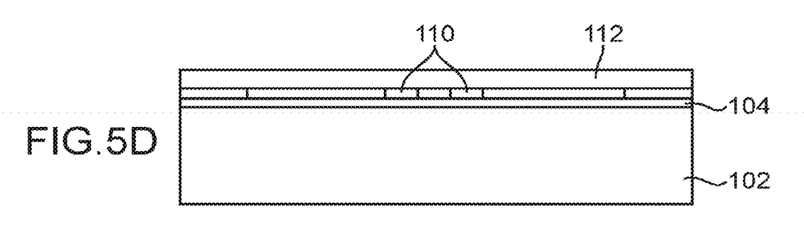

A planarisation step of the layer 112 advantageously takes place, for example by mechanical chemical polishing.

The element thus obtained is represented in FIG. 5D.

Figure 5E:
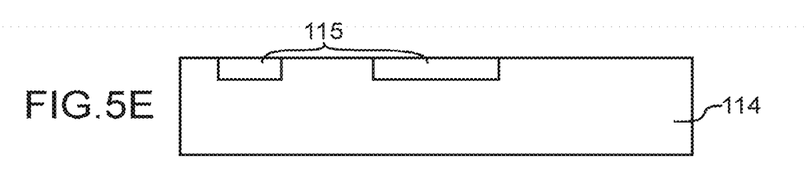

Then, a second substrate 114 is provided, for example, of silicon or any other suitable semi-conductor or a glass substrate, this is represented in FIG. 5E.

During a next step, the front face of the second substrate 114 is structured to form zones 115 for delimiting the cavity and the zone for connecting with the first substrate. This structuring is made by lithography and etching for example by deep reactive ion etching (DRIE) in the case of a silicon substrate.

In the case of manufacturing a relative pressure sensor, the fluid channel is made during this step.

Figure 5F:
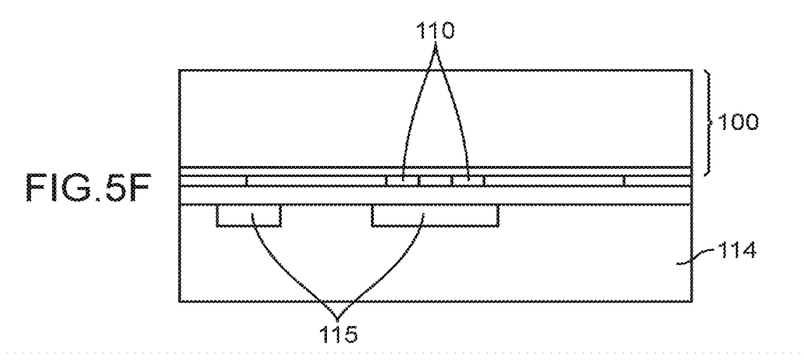

During a next step, the element of FIG. 5D and the structured second substrate 114 are assembled through their front face. In the case of an absolute pressure sensor, the assembly is made under vacuum since the cavity is sealed during this step. The sealing is for example a direct or molecular sealing. Alternatively, the sealing can be eutectic, anodic or implementing a bond or a polymer.

The element thus obtained is represented in FIG. 5F.

During a next step, the membrane is formed. For this, the first substrate is structured, for example a lithography and an etching at the rear face of the first substrate flush with the cavity formed in the second substrate are conducted. The etching is for example a DRIE etching.

Figure 5G:
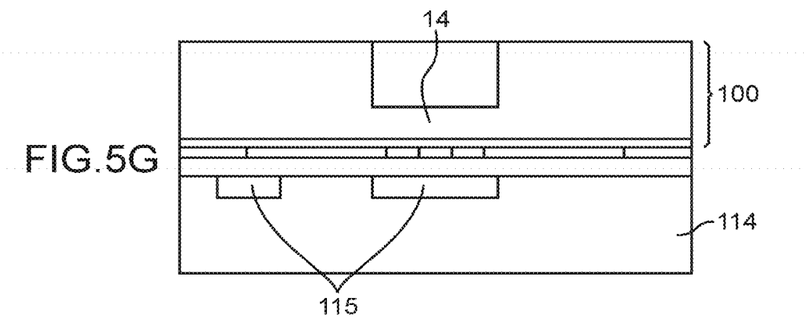

The element thus obtained is represented in FIG. 5G.

During a next step, the connection zone 10 is released by structuring the second substrate, for example a lithography and an etching at the rear face of the second substrate are conducted. The etching is for example a DRIE etching. Alternatively, the first substrate could be structured to make the connection zone.

Figure 5H:
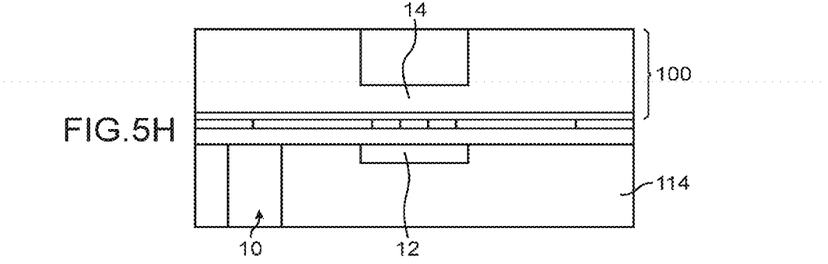

An absolute pressure sensor obtained by the method according to the invention is represented in FIG. 5H.

Figure 5I:
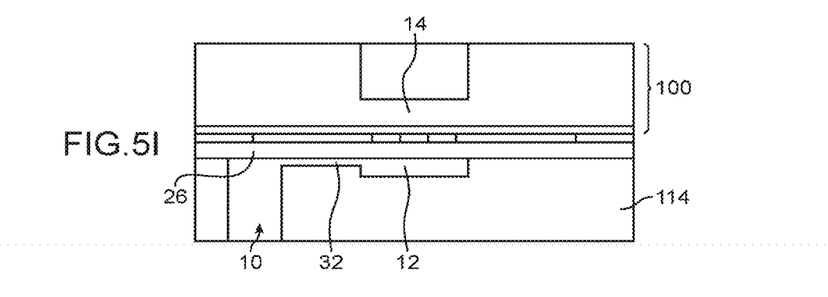

In FIG. 5I, a relative pressure sensor obtained by the method described can be seen. In the example represented, the channel 32 is made at the front face of the second substrate, for example by lithography and etching. Alternatively, it can be made in the electrically insulating layer of the first substrate.

The production in parallel planes is particularly suitable for microelectronic manufacture techniques.

The pressure sensor can be implemented in many applications. It can enable the pressure to be measured on a test bench for engines or motors (avionics, automobile), the pressure in a harsh environment to be measured, for example in oil exploration and development. It can also enable checks of processes, for example of plastic injection processes to be made, . . . . In the automotive field, it can allow checks of ignition, exhaust, . . . . In the field of avionics, it can allow checks of the engine, hydraulic checks . . . .

The pressure sensor according to the invention can be implemented in the field of civil engineering. For example, it can allow the pressure in pipings transporting a liquid, for example water to be measured.

The invention claimed is:

1. A relative pressure sensor comprising:
    a body extending in a sensor plane, the body comprising a first end and a second end, a measurement zone, located at the first end of the body, a connection zone located at the second end of the body, the measurement zone comprising at least one cavity delimited by at least one wall being movable or deformable under effect of a pressure difference between inside of the cavity and a medium, the movable or deformable wall being located at least at rest in a plane parallel to the sensor plane,
    a measurement device measuring displacement or deformation of the movable or deformable wall, the measurement device being located in the cavity;
    at least one electrical connector connecting the measurement device to the connection zone, the at least one electrical connector being disposed in the body, the body configured to be disposed at least partly in the medium such that the first end is in the medium, and the connection zone configured to be insulated from the medium to allow an electrical connection with an external environment separated from the medium; and
    in the body, a fluid channel opening at one end in the cavity and opening at another end in the connection zone to connect the cavity to the external environment, the connection zone being an open area of the body to accommodate the electrical connection with the external environment,
    the sensor being configured to determine relative pressure between the external environment and the medium to be measured, the body of the sensor being sealingly mounted in a passage through a wall separating the medium from the external environment such that the measurement zone is in the medium and the connection zone is in the external environment.

2. The relative pressure sensor according to claim 1, wherein the fluid channel extends in parallel to the movable or deformable wall.

3. The relative pressure sensor according to claim 1, wherein the measurement device comprises at least one gauge of piezoresistive or piezoelectric material disposed on a face of the movable or deformable wall located in the cavity.

4. The relative pressure sensor according to claim 3, wherein the at least one gauge of piezoresistive or piezoelectric material is mounted as a Wheatstone bridge.

5. The relative pressure sensor according to claim 1, wherein the measurement device is a capacitive measurement device.

6. The relative pressure sensor according to claim 1, comprising in the measurement zone, at least two deformable walls located at least at rest in one or more plane(s) parallel to the sensor plane.

7. The relative pressure sensor according to claim 1, wherein the body comprises a first substrate and a second substrate secured to each other, the at least one electrical connector being wholly or partly disposed between and/or in the first substrate and the second substrate.

8. The relative pressure sensor according to claim 1, wherein the movable or deformable wall comprises a membrane.

9. The relative pressure sensor according to claim 1, wherein the movable or deformable wall comprises a substantially undeformable central zone, a deformable peripheral zone, and at least one element for rigidifying the peripheral zone.

10. The relative pressure sensor according to claim 9, wherein the at least one element for rigidifying the peripheral zone comprises at least one beam.

11. A manufacture method for manufacturing a relative pressure sensor according to claim 1, comprising:

a) from a first substrate, making the measurement device and the at least one electrical connector in a front face of the first substrate;
b) from a second substrate, structuring a front face of the second substrate to delimit a part of the cavity and a part of the connection zone;
c) securing the first and the second substrates by their front faces such that the measurement device faces the part of the cavity delimited in the second substrate;
d) structuring the first and/or second substrate to access the at least one electrical connector and form the connection zone and form the fluid channel;
e) sealingly mounting the body in the passage through the wall such that the measurement zone is in the medium and the connection zone is in the external environment.

12. The manufacture method according to claim 11, wherein after c), the first substrate is structured to form the movable or deformable wall.

13. The manufacture method according to claim 11, comprising during a), forming an electrically insulating layer on the at least one electrical connector.

14. The manufacture method according to claim 12, wherein after c), the first substrate is structured to form the movable or deformable wall by thinning at the measurement device.

* * * * *